(12) United States Patent
Alexander

(10) Patent No.: US 6,553,029 B1
(45) Date of Patent: Apr. 22, 2003

(54) LINK AGGREGATION IN ETHERNET FRAME SWITCHES

(75) Inventor: Thomas Alexander, Mulino, OR (US)

(73) Assignee: PMC-Sierra, Inc., Burnaby (CA)

( * ) Notice: Subject to any disclaimer, the term of this patent is extended or adjusted under 35 U.S.C. 154(b) by 0 days.

(21) Appl. No.: 09/351,406

(22) Filed: Jul. 9, 1999

(51) Int. Cl.$^7$ ............................................. H04L 12/28
(52) U.S. Cl. ...................................... 370/389; 370/392
(58) Field of Search ................................ 370/389, 359, 370/360, 381, 382, 383, 392, 394, 395.31, 395.32, 395.54, 395.7, 395.71, 412, 413, 415, 417, 419, 423, 428, 429, 465, 474, 390, 401, 395.53

(56) References Cited

U.S. PATENT DOCUMENTS

| | | | | |
|---|---|---|---|---|
| 5,559,883 A | * | 9/1996 | Williams | .................... 713/201 |
| 5,917,821 A | * | 6/1999 | Gobuyan et al. | ........... 370/392 |
| 6,081,511 A | | 6/2000 | Carr et al. | ................... 370/256 |
| 6,111,880 A | * | 8/2000 | Rusu et al. | ............ 370/395.53 |
| 6,208,644 B1 | * | 3/2001 | Pannell et al. | .............. 370/389 |

OTHER PUBLICATIONS

IEEE Draft P802.3ad, "Supplemental to Carrier Sense Multiple Access with Collision Detection (CSMA/CD) Access Method & Physical Layer Specifications: Link Aggregation".

* cited by examiner

Primary Examiner—Douglas Olms
Assistant Examiner—Phirin Sam
(74) Attorney, Agent, or Firm—Oyen Wiggs Green & Mutala

(57) ABSTRACT

Data packets containing source and destination addresses are received on one or more incoming ports for distribution on one or more outgoing ports. An address look-up table stores previously processed source and destination addresses, together with source and destination contexts associated with the respective source and destination addresses. The contexts represent either a specific physical port, or an aggregated grouping of ports. A distribution table stores, for each aggregated grouping of outgoing ports, a corresponding aggregated group of identifiers of specific outgoing ports. As each packet is received, its source and destination addresses are extracted and the address look-up table is searched for those source and destination addresses. If the address look-up table contains those source and destination addresses then the source and destination contexts associated with those source and destination addresses are retrieved from the address look-up table. If the address look-up table does not contain a source address corresponding to the extracted source address, then a source context corresponding to the extracted source address is derived and stored in the address look-up table with the extracted source address. If the retrieved destination address context represents a specific outgoing port, then the received packet is queued for outgoing transmission on that port. If the retrieved destination address context represents an aggregated grouping of outgoing ports, then the identifiers for the outgoing ports comprising that grouping are retrieved from the distribution table, and the received packet is queued for outgoing transmission on all of the outgoing ports comprising that grouping.

24 Claims, 2 Drawing Sheets

LINK AGGREGATION IN ETHERNET FRAME SWITCHES

TECHNICAL FIELD

This invention is directed to the implementation of link aggregation (also known as trunking, or inverse multiplexing) in Ethernet frame switches. A hardware and firmware combination distributes frames across parallel links without misordering problems.

BACKGROUND

Link aggregation technology termed "inverse multiplexing" has been used for some time in wide-area networks, but has been adopted only recently (as "trunking") in state-of-the-art Ethernet frame switches. Link aggregation provides redundancy and load balancing across medium access control (MAC) entities connecting Ethernet switches to each other, or to high-speed server computers.

The technique consists of establishing multiple, parallel physical links between two entities that must communicate with each other (i.e., switches, routers and/or network servers), and then logically binding these parallel links into a single logical link having a higher effective bandwidth than any one physical link. Packets belonging to a single packet stream, that must be transferred between the two communicating entities, are separated and distributed across the physical links joining them using some well-defined algorithm by the source entity, and are subsequently recombined by the destination entity back into a single stream. Note that link aggregation does not encompass schemes for segmenting packets into smaller units and distributing them across multiple links; it is assumed that packets are transmitted in their entirety on specific physical links.

A typical prior art Ethernet link aggregation implementation utilizes a hardware means for distributing packets across multiple physical links, and re-aggregating them at the receiving end. This is typically due to the high speeds involved (100 Mb/s or even 1000 Mb/s per link) in the packet transfer. The use of such hardware is expensive in terms of the silicon resources required to perform the distribution and collection functions, and is also inflexible in terms of the algorithms used to determine how packets may be distributed across links. Additionally, the complexity of the distribution function when accounting for the various packet ordering and sequencing requirements of the Ethernet protocol renders a hardware-only approach difficult to design and debug. A well-partitioned, mixed hardware/firmware approach is preferable when implementing link aggregation at high speeds. This approach, permits high speeds to be attained while at the same time preserving flexibility in implementation, which is necessary for tracking changing standards or implementing different distribution algorithms.

The preferred link aggregation scheme should satisfy the following objectives:
1. The link aggregation distribution algorithm must not re-order frames belonging to the same connection. In this context, a "connection" is a particular combination of source and destination MAC addresses obtained from the Ethernet frame header.
2. The link aggregation mechanism should distribute frames across multiple parallel physical links as evenly as possible, subject to the above ordering constraint.
3. The distribution algorithm must be capable of preserving the frame ordering when a frame stream transitions from a flood—i.e., a multicast produced when the destination address within the frame is unknown—to a unicast after the destination address has been learned by the normal Ethernet bridging process.
4. The distribution algorithm must preferably distribute not only unicast traffic but also multicast traffic (i.e., traffic sent to a set of destination physical ports) across aggregated links.
5. The link aggregation scheme should use a minimum of hardware resources in order to lower cost, without sacrificing performance at the same time.

This invention provides a link aggregation algorithm embodied within a mixed hardware/firmware packet forwarding datapath that accepts incoming frames, determines whether they are destined to be transferred across an aggregated link (i.e., a single logical link consisting of multiple physical links), and then distributes them across the multiple physical links using a pre-defined distribution algorithm.

SUMMARY OF INVENTION

The invention facilitates distribution of data packets between one or more physical incoming ports and one or more physical outgoing ports. Packets containing source and destination addresses are received on one or more of the incoming ports. An address look-up table stores previously processed source and destination addresses, together with source and destination contexts associated with the respective source and destination addresses. The contexts represent either a specific physical port, or an aggregated grouping of ports. A distribution table stores, for each aggregated grouping of outgoing ports, a corresponding aggregated group of identifiers of specific outgoing ports.

As each packet is received, its source and destination addresses are extracted and the address look-up table is searched for those source and destination addresses. If the address look-up table contains those source and destination addresses then the source and destination contexts associated with those source and destination addresses are retrieved from the address look-up table. If the address look-up table does not contain a source address corresponding to the extracted source address, then a source context corresponding to the extracted source address is derived and stored in the address look-up table with the extracted source address.

If the retrieved destination address context represents a specific outgoing port, then the received packet is queued for outgoing transmission on that port. If the retrieved destination address context represents an aggregated grouping of outgoing ports, then the identifiers for the outgoing ports comprising that grouping are retrieved from the distribution table, and the received packet is queued for outgoing transmission on all of the outgoing ports comprising that grouping.

Advantageously, the source context corresponding to an extracted source address is derived by producing a hash key through application of a hash function to the extracted source address. The incoming port on which the packet containing the extracted source address was received is identified. If the identified incoming port is within an aggregated grouping of incoming ports, then a port identifier representative that aggregated grouping is derived. If the identified incoming port is not within an aggregated grouping of incoming ports, then a port identifier representative of the identified incoming port is derived. The hash key and the port identifier are then combined to form the source context corresponding to the extracted source address.

The hash function is preferably selected such that successive application of the hash function to all source and destination addresses expected to be seen by the Ethernet switch will produce a lowest value hash key, a highest value hash key, and a group of hash keys having intermediate values distributed evenly between the lowest and highest values.

The distribution table contains a separate port identifier look-up table for each aggregated grouping of outgoing ports. Advantageously, the hash key is an N bit hash key; and, each port identifier look-up table contains $2^N$ entries occupying $2^N$ consecutive locations, with each entry being an identifier of a particular one of the physical outgoing ports.

Identifiers for particular outgoing ports are retrieved from the distribution table by extracting first and second N bit hash keys which form part of the retrieved destination and source address contexts respectively. The hash keys are combined to form an N bit connection identifier. The port identifier look-up table corresponding to the aggregated grouping represented by the retrieved destination address is selected, and the entry at the table location corresponding to the value of the N bit connection identifier is retrieved.

If the address look-up table does not contain a destination address corresponding to the extracted destination address then first and second hash keys are produced by applying a hash function to the extracted source and destination addresses respectively. The hash keys are combined to form an N bit connection identifier. The incoming port on which the packet containing the extracted source address was received is identified. All of the aggregated groupings are scanned to identify all outgoing ports to which packets may be directed from the incoming port on which the packet was received. For each one of those outgoing ports, the port identifier look-up table corresponding to the aggregated grouping containing that outgoing port is selected, the entry at the table location corresponding to the value of the N bit connection identifier is retrieved, and the received packet is queued for outgoing transmission on the outgoing port corresponding to the retrieved entry.

DESCRIPTION

Figure 1:
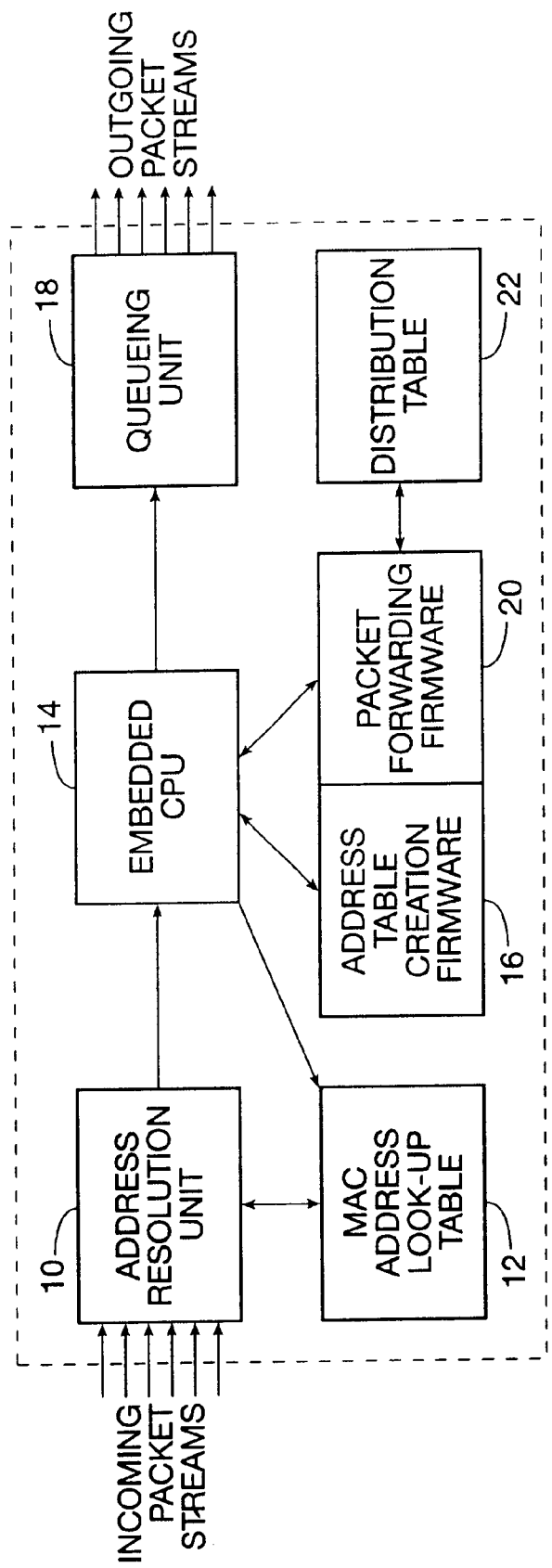
FIG. 1 is a block diagram of a hardware and firmware link aggregation mechanism in accordance with the invention.

As shown in FIG. 1, the hardware elements constituting the link aggregation packet datapath comprise address resolution unit 10, MAC address look-up table 12, embedded CPU 14 and queuing unit 18. Address resolution unit 10 accepts Ethernet packets from multiple incoming packet streams, some of which may be logically grouped-to form aggregate links, and resolves the source and destination addresses in the-packets, as hereinafter explained. MAC address look-up table 12, which is typically implemented using random access memory (RAM), is used by address resolution unit 10 to translate Ethernet MAC addresses taken from packet headers into contexts which are used during the forwarding process, as hereinafter explained. Embedded CPU 14 accepts the contexts associated with the addresses contained within the incoming Ethernet packets, executes firmware routine 16 to update MAC address look-up table 12 with new information, and executes packet forwarding routine 20 by selecting one or more links on which to transfer individual packet streams. Queuing unit 18 accepts the incoming packet data and packet forwarding commands produced by embedded CPU 14, and queues the packets on the selected link(s). The actual link aggregation collection and distribution processes are controlled via execution of packet forwarding firmware routine 20 by embedded CPU 14, utilizing data in distribution table 22.

Figure 2:
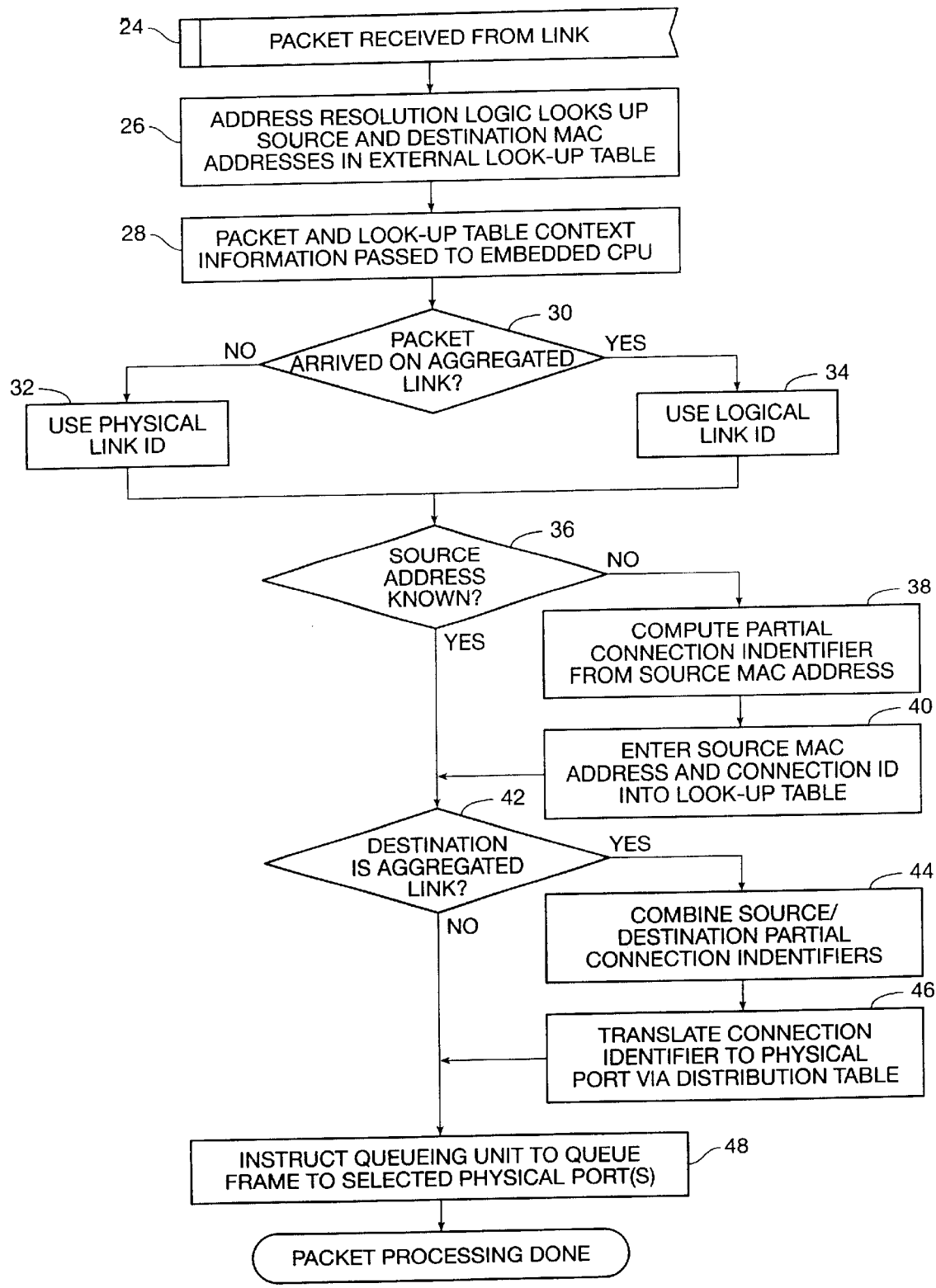
FIG. 2 is flowchart which illustrates the general packet forwarding flow methodology of the invention.

The general packet forwarding flow is shown in FIG. 2 and will now be described. It is assumed that external means exist for accepting and transmitting packets from and to the physical MAC links; such means are well known to and understood by persons skilled in the art, and need not be described here. The discussion will focus on the control operations required to transfer packets to and from these physical links, when some or all of these physical links are being aggregated into larger logical links.

Address resolution unit 10 accepts multiple streams of packets (one stream from each physical link: FIG. 2, block 24) and performs an address look-up process on each packet using MAC address look-up table 12 (FIG. 2, block 26). Address lookup table 12 contains a set of MAC addresses known to the Ethernet switch as well as context information that must be associated with the MAC addresses for use in packet forwarding. (The contents of address look-up table 12 are generated by firmware running on embedded CPU 14, as hereinafter explained.) Address resolution unit 10 thus extracts the source and destination MAC addresses from each Ethernet packet, looks up the addresses in MAC address look-up table 12 to determine if associated contexts exist for the source and destination MAC addresses, and also retrieves the contexts from table 12 if they exist. Address resolution unit 10 then presents the packet data along with the source and destination MAC address contexts (if found) to embedded CPU 14 for processing by packet forwarding firmware routine 20 (FIG. 2, block 28).

Embedded CPU 14 implements packet forwarding firmware routine 20 to perform the actual control decisions required to forward the packet. Two different firmware routines 16, 20 are executed. Address table creation ("learning function") firmware routine 16 is invoked when address resolution unit 10 determines that a particular source MAC address found within a packet is not present in address look-up table 12; in which case table 12 is updated accordingly. Packet forwarding ("forwarding function") firmware routine 20 is executed for every packet, to produce the actual forwarding command (i.e., the decision as to which physical port or ports the packet must be forwarded to) supplied to queuing unit 18. Packet forwarding routine 20 utilizes distribution table 22 to select among ports that have been grouped into aggregates.

After the firmware executed by embedded CPU 14 has completed processing each packet, the packet is passed to queuing unit 18, along with the forwarding command generated by forwarding function 20. Queuing unit 18 places the packet in one or more queues according to the forwarding command. Each queue corresponds to a specific physical port, with a one-to-one mapping between queues and ports. The packet is then stored within the queue(s) until it can be transmitted, after which it is read from the queue(s) and transmitted out the selected port(s). Note that the packet is transmitted out multiple ports if forwarding function 20 determines that the packet must be multicast to a set of destinations, rather than being unicast to a single specific destination.

The learning and forwarding firmware functions will now be described in greater detail.

Learning Function

The learning function is responsible for creating and updating address look-up table 12 in response to incoming packets and in accordance with the basic requirements of standard Ethernet switches. The precise organization of address look-up table 12 need not be described. As is well known to persons skilled in the art, there are a number of schemes for organizing packet switch address tables, any of which may be used in practising this invention.

If a packet arrives bearing a source Ethernet MAC address that was not found in look-up table 12 by address resolution unit 10, learning function 16 is invoked to update look-up table 12 with the new address (i.e. processing branches along the "No" exit from FIG. 2, block 36). Learning function 16 first computes a hash function on the source Ethernet MAC address, generating an N-bit hash key ("partial connection identifier") from the 48-bit MAC address, where N is some small integer in the range of 3 to 8 (FIG. 2, block 38). The physical port on which the packet arrived is then determined. If the physical port is found to be associated with an aggregate group (i.e., it is one of a set of ports that have been bound into a single logical port), then the logical identifier assigned to the aggregate group is also determined. The hash key is then stored into address look-up table 12 in conjunction with the actual Ethernet MAC address and the port identifier (FIG. 2, block 40). The physical port identifier is used if the port is not part of an aggregate group (i.e. if processing branched along the "No" exit from block 30 and through block 32), while the logical identifier is used for ports that have been aggregated (i.e. if processing branched along the "Yes" exit from block 30 and through block 34). The hash key and port identifier are considered to form the "context" for the given MAC address.

The hash function should be selected to ensure an even distribution of hash key values over the range of MAC addresses that are expected to be seen by the Ethernet switch. As a specific example, the EXACT™ Ethernet switch system employs an exclusive-OR based hash function, wherein the 48-bit MAC address is divided into 16-bit blocks, which are then exclusive-ORed together to form a single 16-bit number; the 3 least significant bits (LSBs) of this number are taken to produce a 3-bit hash key. Other schemes such as CRC-based or checksum-based hashes may also be used.

After the learning function completes its task, it is assumed that subsequent packets that arrive carrying the same Ethernet MAC address as either source or destination will cause address resolution unit 10 to retrieve the context information stored previously for that MAC address, and present that information to embedded CPU 14 for processing.

Forwarding Function

The forwarding function is executed by embedded CPU 14 to accept the context information retrieved by address resolution unit 10 for the source and destination MAC addresses, and to convert this information into the actual forwarding command supplied to queuing unit 18 along with the packet to cause it to be transmitted out the desired port(s). The forwarding function utilizes distribution table 22 to aid in selecting among multiple ports that have been bound into a logical aggregate.

The data structure of distribution table 22 is organized as a set of look-up tables that map between hash keys (stored with the source and destination MAC addresses by the learning function) and specific physical ports that are members of aggregate groups. One look-up table is associated with each aggregate group; there are thus as many look-up tables as there are aggregate groups. The size of each look-up table is determined by 2 raised to the power of the number of bits in the hash key. For instance, if there are two sets of aggregate groups supported by the system, and the hash keys are 3 bits in size, then the distribution table data structure will consist of two look-up tables, each containing $2^3=8$ entries. Each look-up table is bound to the logical identifier assigned to the given aggregate group. The look-up tables must be updated as physical ports are added to or removed from aggregate groups.

Distribution table 22's data structure is created and updated as aggregate groups are formed or modified during the operation of the Ethernet switch. The creation of an aggregate group, and the association of one or more physical MAC ports with that aggregate group, entails the creation and initialization of a new look-up table within the distribution table data structure. The look-up table should be set up with the various physical port indices distributed evenly across its entries. For instance, if the hash key width is 3 bits, and ports 6, 17, 23 and 39 are the constituents of a given aggregate group, then the look-up table (LUT) associated with that aggregate group is created as:

| Entry | LUT Contents |
|---|---|
| 0 | 6 |
| 1 | 17 |
| 2 | 23 |
| 3 | 39 |
| 4 | 6 |
| 5 | 17 |
| 6 | 23 |
| 7 | 39 |

The forwarding function will now be described in further detail, given the foregoing distribution table data structure background description. If the context information for the destination MAC address indicates that the target is a specific physical port (i.e., not part of an aggregate group), then the forwarding function extracts the physical port index from the context information and supplies it to queuing unit 18 along with the packet data (i.e. if processing branches along the "No" exit from FIG. 2, block 42 and through block 48). Queuing unit 18 then places the packet on the proper queue and subsequently causes it to be transmitted out the selected physical port.

If the context information for the destination address indicates, however, that the target is an aggregate group (i.e. if processing branches along the "Yes" exit from FIG. 2, block 42) then the logical identifier assigned to the aggregate group is retrieved and is used to select the proper look-up table contained within the distribution table data structure. The hash keys (partial connection identifiers) stored into the contexts for the source and destination MAC addresses are obtained from address resolution unit 10 and combined to generate a "connection identifier" with the same number of bits (FIG. 2, block 44). (In the EXACT™ Ethernet switch, a Boolean exclusive-OR operation is used to combine the hash keys without increasing the number of bits.) This connection identifier is then used to index into the selected look-up table, and finally retrieve an actual physical port index on which the packet must be transmitted (FIG. 2, block 46).

If address resolution unit 10 is unable to find a match for the destination MAC address in address look-up table 12, then a slightly different operation is performed. According to the rules of Ethernet frame switching, a packet received with an unknown destination MAC address must be forwarded to all of the possible destinations that are reachable from the logical or physical link on which the packet arrived, excepting the source link itself. To accomplish this, the forwarding function performs the following operations:

1. An N-bit hash key is computed from the destination MAC address, in a manner similar to that described above in relation to the learning function. Note that this computation is necessary as the destination MAC address does not correspond to any valid context present in address look-up table 12, and thus no hash key can be obtained for this address from the contexts.
2. The hash keys for the source and destination MAC addresses are combined to generate a connection identifier, as previously explained.
3. All of the aggregate groups created in the system which are reachable from the source link, are scanned. For each aggregate group, the appropriate look-up table within the distribution table data structure is located. The connection identifier generated in step 2 above is used to index into the located table. Queuing unit 18 is then directed to send a copy of the packet to the physical port so selected.
4. Finally, queuing unit 18 is directed to send copies of the packet to the remaining physical ports, i.e., the ports not present in any aggregate group and also reachable from the source link.

The use of the look-up tables in the distribution table data structure, in conjunction with the computation of a connection identifier from the source and destination MAC addresses, permits the forwarding function to distribute transmitted frames in a reasonably even manner across the multiple physical links encompassed by a given aggregate group without violating the packet ordering restrictions imposed by the Ethernet protocol. As a particular pair of MAC addresses will always produce the same connection identifier, and a particular connection identifier will always index to the same physical port within any given look-up table, it is guaranteed that all frames bearing the same combination of source and destination MAC addresses will always be sent down the same physical link, preventing frame misordering from occurring. The use of both the source and destination MAC addresses in generating connection identifiers permits the best possible distribution of traffic across the links in the aggregate groups subject to the ordering constraints.

The process followed to deal with frames with unknown destination MAC addresses is intended to preserve the ordering of frames if the unknown destination MAC address may change to a known address during operation (by the action of the learning function). As the forwarding function will compute the same hash key for the destination MAC address as the learning function, the value of the connection identifier will not change even if the MAC address becomes known. Therefore, the specific physical port selected within each aggregate group will remain the same, and frame ordering is preserved.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of distributing data packets between one or more physical incoming ports and one or more physical outgoing ports, said method comprising:

(a) receiving said packets from one or more of said incoming ports, each one of said packets containing a source address and a destination address;
   (b) providing an address look-up table for storing source addresses, source contexts associated with respective source addresses, destination addresses, and destination contexts associated with respective destination addresses, wherein said source contexts are respectively representative of either a particular one of said physical incoming ports or an aggregated grouping of said physical incoming ports and said destination contexts are respectively representative of either a particular one of said physical outgoing ports or an aggregated grouping of said physical outgoing ports;
   (c) providing a distribution table for storing, for each one of said aggregated groupings of said physical outgoing ports, a corresponding aggregated group of identifiers of particular ones of said physical outgoing ports;
   (d) for each one of said received packets:
      (i) extracting said source and destination addresses from said one of said received packets;
      (ii) searching said address look-up table for source and destination addresses corresponding to said extracted source and destination addresses;
      (iii) if said address look-up table contains source and destination addresses corresponding to said extracted source and destination addresses, retrieving from said address look-up table said source and destination contexts associated with respective extracted source and destination addresses;
      (iv) if said address look-up table does not contain the source address corresponding to said extracted source address, deriving a source context corresponding to said extracted source address and storing said extracted source address in said address look-up table together with said derived source context;
      (vi) if said retrieved destination address context is representative of a particular one of said physical outgoing ports, queuing said one of said received packets for outgoing transmission on said particular one of said physical outgoing ports; and,
      (vi) if said retrieved destination address context is representative of an aggregated grouping of said physical outgoing ports, retrieving from said distribution table said identifiers for said particular ones of said physical outgoing ports corresponding to said aggregated grouping of which said retrieved destination address context is representative, and queuing said one of said received packets for outgoing transmission on said particular ones of said physical outgoing ports corresponding to said aggregated grouping of which said retrieved destination address context is representative.

2. A method as defined in claim 1, wherein said deriving of a source context corresponding to said extracted source address further comprises:

(a) producing a hash key by applying a hash function to said extracted source address;
   (b) determining that one of said physical incoming ports on which said one of said received packets was received;
   (c) if said one of said physical incoming ports on which said one of said received packets was received is within one of said aggregated groupings of said physical incoming ports, deriving a port identifier representative of said one of said aggregated groupings;

(d) if said one of said physical incoming ports on which said one of said received packets was received is not within one of said aggregated groupings of said physical incoming ports, deriving a port identifier representative of said one of said physical incoming ports on which said one of said received packets was received; and, (e) combining said hash key and said port identifier to form said source context corresponding to said extracted source address.

3. A method as defined in claim 2, wherein said hash function is selected such that successive application of said hash function to all possible ones of said extracted source and destination addresses will produce a lowest value hash key, a highest value hash key, and a group of hash keys having intermediate values distributed evenly between said lowest and highest values.

4. A method as defined in claim 3, wherein:
(a) said source and destination addresses are 48 bit MAC addresses; and,
(b) said hash key is an N bit hash key, where $3 \leq N \leq 8$.

5. A method as defined in claim 4, wherein said hash function further comprises:
(a) separating said 48 bit MAC address into:
(i) a first group comprising the 16 most significant bits of said 48 bit MAC address;
(ii) a second group comprising the 16 least significant bits of said 48 bit MAC address;
(iii) a third group comprising the 16 bits of said 48 bit MAC address intermediate between said 16 most significant bits and 16 least significant bits;
(b) exclusive-ORing said first, second and third groups to form a fourth group of 16 bits;
(c) extracting, and defining as said hash key, the three least significant bits of said fourth group of 16 bits.

6. A method as defined in claim 2, wherein said distribution table further comprises a port identifier look-up table for each one of said aggregated groupings of said physical outgoing ports.

7. A method as defined in claim 6, wherein:
(a) said hash key is an N bit hash key; and,
(b) each one of said port identifier look-up tables contains $2^N$ entries occupying $2^N$ consecutive locations, each one of said entries comprising an identifier of a particular one of said physical outgoing ports.

8. A method as defined in claim 7, wherein said retrieving from said distribution table of said identifiers for said particular ones of said physical outgoing ports corresponding to said aggregated grouping of which said retrieved destination address context is representative further comprises:
(a) extracting a first N bit hash key forming a part of said retrieved destination address context;
(b) extracting a second N bit hash key forming a part of said retrieved source address context;
(c) combining said first and second hash keys to form an N bit connection identifier;
(d) selecting that one of said port identifier look-up tables corresponding to said aggregated grouping of which said retrieved destination address context is representative; and,
(e) retrieving from said selected one of said port identifier look-up tables that one of said entries located within said selected one of said port identifier look-up tables at said one of said locations corresponding to the value of said N bit connection identifier.

9. A method as defined in claim 7, further comprising, if said address look-up table does not contain a destination address corresponding to said extracted destination address:
(a) producing a first hash key by applying a hash function to said extracted source address;
(b) producing a second hash key by applying said hash function to said extracted destination address;
(c) combining said first and second hash keys to form an N bit connection identifier;
(d) determining that one of said physical incoming ports on which said one of said received packets was received;
(e) scanning all of said aggregated groupings to identify all of said physical outgoing ports to which packets may be directed from said one of said physical incoming ports on which said one of said received packets was received;
(f) for each one of said identified physical outgoing ports:
(i) selecting that one of said port identifier look-up tables corresponding to said aggregated grouping within which said one of said identified physical outgoing ports is contained;
(ii) retrieving from said selected one of said port identifier look-up tables that one of said entries located within said selected one of said port identifier look-up tables at said one of said locations corresponding to the value of said N bit connection identifier; and,
(iii) queuing said one of said received packets for outgoing transmission on that one of said physical outgoing ports corresponding to said retrieved entry.

10. A method as defined in claim 9, wherein said hash function is selected such that successive application of said hash function to all possible ones of said extracted source and destination addresses will produce a lowest value hash key, a highest value hash key, and a group of hash keys having intermediate values distributed evenly between said lowest and highest values.

11. A method as defined in claim 10, wherein:
(a) said source and destination addresses are 48 bit MAC addresses; and,
(b) said hash key is an N bit hash key, where $3 \leq N \leq 8$.

12. A method as defined in claim 11, wherein said hash function further comprises:
(a) separating said 48 bit MAC address into:
(i) a first group comprising the 16 most significant bits of said 48 bit MAC address;
(ii) a second group comprising the 16 least significant bits of said 48 bit MAC address;
(iii) a third group comprising the 16 bits of said 48 bit MAC address intermediate between said 16 most significant bits and 16 least significant bits;
(b) exclusive-ORing said first, second and third groups to form a fourth group of 16 bits;
(c) extracting, and defining as said hash key, the three least significant bits of said fourth group of 16 bits.

13. Apparatus for distributing data packets between one or more physical incoming ports and one or more physical outgoing ports, said apparatus comprising:
(a) an address resolution unit for receiving said packets from one or more of said incoming ports, each one of said packets containing a source address and a destination address;
(b) first memory means for storing an address look-up table, said first memory means coupled to said address resolution unit to enable read and write access to said address look-up table by said address resolution unit, said address look-up table for storing source addresses, source contexts associated with respective source addresses, destination addresses, and destination contexts associated with respective destination addresses, wherein said source contexts are respectively representative of either a particular one of said physical incoming ports or an aggregated grouping of said physical incoming ports and said destination contexts are respectively representative of either a particular one of said physical outgoing ports or an aggregated grouping of said physical outgoing ports;

(c) a processor coupled to said address resolution unit and to said first memory means, said processor for processing contexts associated with addresses contained within said packets, for updating said address look-up table, and for selecting one or more of said outgoing ports on which to transmit said packets;

(d) second memory means for storing a distribution table, said second memory means coupled to said processor to enable read and write access to said distribution table by said processor, said distribution table for storing, for each one of said aggregated groupings of said physical outgoing ports, a corresponding aggregated group of identifiers of particular ones of said physical outgoing ports;

(e) a queuing unit coupled between said processor and said outgoing ports, said queuing unit for queuing said received packets for outgoing transmission on said selected outgoing ports;

(f) said processor operable to, for each one of said received packets:
  (i) extract said source and destination addresses from said one of said received packets;
  (ii) search said address look-up table for source and destination addresses corresponding to said extracted source and destination addresses;
  (iii) if said address look-up table contains source and destination addresses corresponding to said extracted source and destination addresses, retrieve from said address look-up table said source and destination contexts associated with respective extracted source and destination addresses;
  (iv) if said address look-up table does not contain the source address corresponding to said extracted source address, derive a source context corresponding to said extracted source address and store said extracted source address in said address look-up table together with said derived source context;
  (v) if said retrieved destination address context is representative of a particular one of said physical outgoing ports, forward said one of said received packets to said queuing unit for outgoing transmission on said particular one of said physical outgoing ports; and,
  (vi) if said retrieved destination address context is representative of an aggregated grouping of said physical outgoing ports, retrieve from said distribution table said identifiers for said particular ones of said physical outgoing ports corresponding to said aggregated grouping of which said retrieved destination address context is representative, and forward said one of said received packets to said queuing unit for outgoing transmission on said particular ones of said physical outgoing ports corresponding to said aggregated grouping of which said retrieved destination address context is representative.

14. Apparatus as defined in claim 13, wherein said processor is further operable in said deriving of a source context corresponding to said extracted source address to:
  (a) produce a hash key by applying a hash function to said extracted source address;
  (b) determine that one of said physical incoming ports on which said one of said received packets was received;
  (c) if said one of said physical incoming ports on which said one of said received packets was received is within one of said aggregated groupings of said physical incoming ports, derive a port identifier representative of said one of said aggregated groupings;
  (d) if said one of said physical incoming ports on which said one of said received packets was received is not within one of said aggregated groupings of said physical incoming ports, derive a port identifier representative of said one of said physical incoming ports on which said one of said received packets was received; and,
  (e) combine said hash key and said port identifier to form said source context corresponding to said extracted source address.

15. Apparatus as defined in claim 14, wherein said hash function is selected such that successive application of said hash function to all possible ones of said extracted source and destination addresses will produce a lowest value hash key, a highest value hash key, and a group of hash keys having intermediate values distributed evenly between said lowest and highest values.

16. Apparatus as defined in claim 15, wherein:
  (a) said source and destination addresses are 48 bit MAC addresses; and,
  (b) said hash key is an N bit hash key, where $3 \leq N \leq 8$.

17. Apparatus as defined in claim 16, wherein said processor is further operable in said applying of said hash function to:
  (a) separate said 48 bit MAC address into:
    (i) a first group comprising the 16 most significant bits of said 48 bit MAC address;
    (ii) a second group comprising the 16 least significant bits of said 48 bit MAC address;
    (iii) a third group comprising the 16 bits of said 48 bit MAC address intermediate between said 16 most significant bits and 16 least significant bits;
  (b) exclusive-OR said first, second and third groups to form a fourth group of 16 bits;
  (c) extract and define as said hash key, the three least significant bits of said fourth group of 16 bits.

18. Apparatus as defined in claim 14, wherein said distribution table further comprises a port identifier look-up table for each one of said aggregated groupings of said physical outgoing ports.

19. Apparatus as defined in claim 18, wherein:
  (a) said hash key is an N bit hash key; and,
  (b) each one of said port identifier look-up tables contains $2^N$ entries occupying $2^N$ consecutive locations, each one of said entries comprising an identifier of a particular one of said physical outgoing ports.

20. Apparatus as defined in claim 19, wherein said processor is further operable in said retrieving from said distribution table of said identifiers for said particular ones of said physical outgoing ports corresponding to said aggregated grouping of which said retrieved destination address context is representative, to:
  (a) extract a first N bit hash key forming a part of said retrieved destination address context;

(b) extract a second N bit hash key forming a part of said retrieved source address context;

(c) combine said first and second hash keys to form an N bit connection identifier;

(d) select that one of said port identifier look-up tables corresponding to said aggregated grouping of which said retrieved destination address context is representative; and, (e) retrieve from said selected one of said port identifier look-up tables that one of said entries located within said selected one of said port identifier look-up tables at said one of said locations corresponding to the value of said N bit connection identifier.

21. Apparatus as defined in claim 19, wherein said processor is further operable, if said address look-up table does not contain a destination address corresponding to said extracted destination address, to:

(a) produce a first hash key by applying a hash function to said extracted source address;

(b) produce a second hash key by applying said hash function to said extracted destination address;

(c) combine said first and second hash keys to form an N bit connection identifier;

(d) determine that one of said physical incoming ports on which said one of said received packets was received;

(e) scan all of said aggregated groupings to identify all of said physical outgoing ports to which packets may be directed from said one of said physical incoming ports on which said one of said received packets was received;

(f) for each one of said identified physical outgoing ports:
 (i) select that one of said port identifier look-up tables corresponding to said aggregated grouping within which said one of said identified physical outgoing ports is contained;
 (ii) retrieve from said selected one of said port identifier look-up tables that one of said entries located within said selected one of said port identifier look-up tables at said one of said locations corresponding to the value of said N bit connection identifier; and,
 (iii) forward said one of said received packets to said queuing unit for outgoing transmission on that one of said physical outgoing ports corresponding to said retrieved entry.

22. Apparatus as defined in claim 21, wherein said hash function is selected such that successive application of said hash function to all possible ones of said extracted source and destination addresses will produce a lowest value hash key, a highest value hash key, and a group of hash keys having intermediate values distributed evenly between said lowest and highest values.

23. Apparatus as defined in claim 22, wherein:

(a) said source and destination addresses are 48 bit MAC addresses; and, (b) said hash key is an N bit hash key, where $3 \leq N \leq 8$.

24. Apparatus as defined in claim 23, wherein said processor is further operable in said applying of said hash function to:

(a) separate said 48 bit MAC address into:
 (i) a first group comprising the 16 most significant bits of said 48 bit MAC address;
 (ii) a second group comprising the 16 least significant bits of said 48 bit MAC address;
 (iii) a third group comprising the 16 bits of said 48 bit MAC address intermediate between said 16 most significant bits and 16 least significant bits;

(b) exclusive-OR said first, second and third groups to form a fourth group of 16 bits;

(c) extract and define as said hash key, the three least significant bits of said fourth group of 16 bits.

\* \* \* \* \*